United States Patent [19]

Morimoto

[11] Patent Number: 4,730,522
[45] Date of Patent: Mar. 15, 1988

[54] SYSTEM FOR CONTROLLING THE PRESSURE OF OIL IN A SYSTEM FOR A CONTINUOUSLY VARIABLE TRANSMISSION

[75] Inventor: Yoshihiko Morimoto, Mitaka, Japan

[73] Assignee: Fuji Jukogyo Kabushiki Kaisha, Tokyo, Japan

[21] Appl. No.: 900,219

[22] Filed: Aug. 26, 1986

[30] Foreign Application Priority Data

Aug. 30, 1985 [JP] Japan ................................ 60-191049

[51] Int. Cl.$^4$ .............................................. B60K 41/16
[52] U.S. Cl. .......................................... 74/868; 74/866
[58] Field of Search ................. 74/864, 865, 866, 867, 74/868; 474/12, 18

[56] References Cited

U.S. PATENT DOCUMENTS

| 4,369,675 | 1/1983 | Deursen | 74/864 |
| 4,458,318 | 7/1984 | Smit et al. | 474/12 X |
| 4,522,086 | 6/1985 | Haley | 74/867 |
| 4,533,340 | 8/1985 | Abo et al. | 474/18 X |
| 4,579,021 | 4/1986 | Yamamuro et al. | 74/869 |
| 4,619,157 | 10/1986 | Sakai | 474/18 X |
| 4,619,629 | 10/1986 | Shigematsu et al. | 474/18 X |
| 4,631,043 | 12/1986 | Tokoro et al. | 474/18 |
| 4,638,689 | 1/1987 | Sakai | 74/866 |

FOREIGN PATENT DOCUMENTS

| 58-88252 | 5/1983 | Japan . | |
| 0095263 | 5/1985 | Japan | 74/866 |
| 2138895 | 10/1984 | United Kingdom | 74/867 |

Primary Examiner—Leslie Braun
Assistant Examiner—Dwight G. Diehl
Attorney, Agent, or Firm—Martin A. Farber

[57] ABSTRACT

A control system for a continuously variable transmission has a line pressure control valve having ports and a spool for controlling the line pressure of oil supplied to a cylinder of a pulley device to change the transmission ratio. The line pressure control valve has chambers. When a motor vehicle is decelerated at coasting of the vehicle, the spool of the line pressure control valve is shifted by controlling the amount of oil supplied to the chambers of the valve, so that the line pressure increases in accordance with the magnitude of the deceleration.

13 Claims, 8 Drawing Figures

SYSTEM FOR CONTROLLING THE PRESSURE OF OIL IN A SYSTEM FOR A CONTINUOUSLY VARIABLE TRANSMISSION

BACKGROUND OF THE INVENTION

The present invention relates to a control system for a continuously variable belt-drive automatic transmission for a motor vehicle, and more particularly to a system for controlling line pressure in a hydraulic circuit for the transmission.

A known control system for a continuously variable belt-drive transmission disclosed in U.S. Pat. No. 4,369,675 comprises an endless belt running over a drive pulley and a driven pulley. Each pulley comprises a movable conical disc which is axially moved by a fluid operated servo device so as to vary the running diameter of the belt on the pulleys in dependency on driving conditions. The system is provided with a hydraulic circuit including a pump, a line pressure control valve and a transmission ratio control valve. Each valve comprises a spool to control the oil supplied to the servo devices.

The transmission ratio control valve operates to determine the transmission ratio in accordance with the opening degree of a throttle valve of an engine of the vehicle and the speed of the engine. The line pressure control valve is adapted to control the line pressure in accordance with the transmission ratio and the engine speed. The line pressure is controlled to prevent the belt from slipping on pulleys in order to transmit the output of the engine.

Japanese Patent Laid Open No. 58-88252 discloses a transmission control system provided with a torque motor for operating a line pressure control valve in accordance with engine torque and transmission ratio so as to control line pressure. The system is arranged to control the line pressure to reduce as the engine torque decreases.

Accordingly, the line pressure is kept at a minimum value, when a motor vehicle is in a coasting state by releasing an accelerator pedal. Under such a coasting state, if a brake pedal is depressed to decelerate the vehicle, the deceleration is transmitted to a driven pulley of the transmission, thereby rapidly reducing the rotational speed of the driven pulley. Since the line pressure is at a minimum value in such a state and hence belt gripping force of the driven pulley is small, the belt may slip on pulleys, which will cause decrease of the engine-braking effect.

SUMMARY OF THE INVENTION

The object of the present invention is to provide a system for controlling the line pressure so as to prevent a belt from slipping on pulleys at braking a motor vehicle in a coasting state.

In accordance with the present invention, the line pressure is controlled to be increased with increase of the magnitude of deceleration of a vehicle in a coasting state.

According to the present invention, there is provided a control system for a continuously variable transmission for transmitting the power of an internal combustion engine to driving wheels through a clutch. The transmission has a drive pulley having a hydraulically shiftable disc and a first hydraulic cylinder for shifting the disc, a driven pulley having a hydraulically shiftable disc and a second hydraulic cylinder for operating the disc, a belt engaged with both pulleys, line pressure control valve having ports and a spool, a transmission ratio control valve having ports and a spool, a first hydraulic circuit having a pump for supplying oil to the first cylinder through the line pressure control valve and transmission ratio control valve. The system comprises a second hydraulic circuit for supplying oil to the line pressure control valve so as to shift the spool, control valve means provided in the second hydraulic circuit for controlling the amount of oil supplied to the line pressure control valve, first means for detecting a coasting state of said motor vehicle and for producing a coasting signal, second means for detecting the magnitude of deceleration of the motor vehicle and for producing a deceleration signal dependent on the magnitude, and third means responsive to the coasting signal and to the deceleration signal for operating the control valve means, so that the spool of the line pressure control valve is shifted to increase the line pressure in dependency on the magnitude of the deceleration.

The other objects and features of this invention will become understood from the following description with reference to the accompanying drawings.

DETAILED DESCRIPTION OF THE PREFERRED EMBODIMENT

Figure 1:
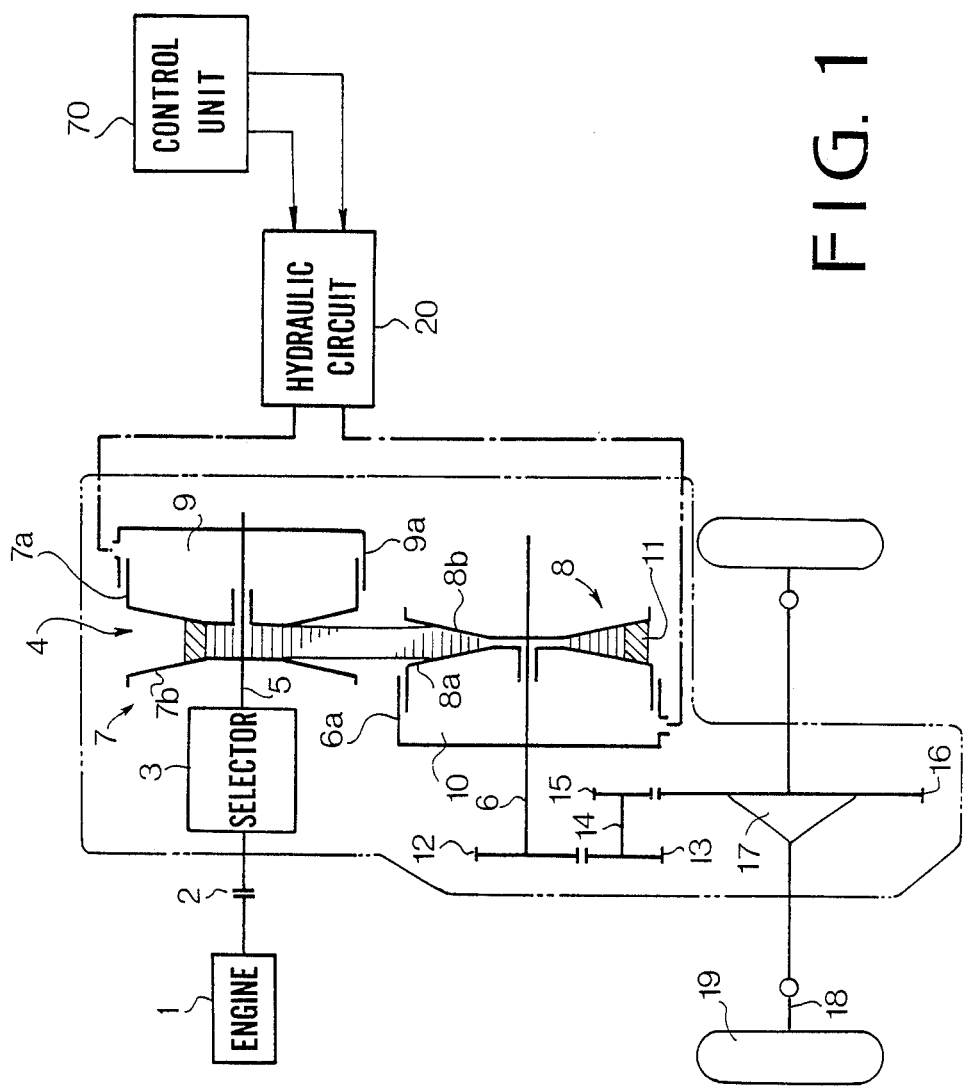
FIG. 1 is a schematic illustration of a continuously variable belt-drive transmission.

Referring to FIG. 1, the continuously variable belt-drive automatic transmission for a motor vehicle to which the present invention is applied, comprises an electromagnetic powder clutch 2 for transmitting the power of an engine 1 to transmission 4 through a selector mechanism 3.

The belt-drive transmission has a main shaft 5 and an output shaft 6 provided in parallel with the main shaft 5. A drive pulley (primary pulley) 7 and a driven pulley (secondary pulley) 8 are mounted on shafts 5 and 6 respectively. A fixed conical disc 7b of the drive pulley 7 is integral with main shaft 5 and an axially movable conical disc 7a is axially slidably mounted on the main shaft 5. The movable conical disc 7a also slides in a cylinder 9a formed on the main shaft 5 to provide a servo device. A chamber 9 of the servo device communicates with a hydraulic circuit 20.

A fixed conical disc 8b of the driven pulley 8 is formed on the output shaft 6 opposite a movable conical disc 8a having a cylindrical portion which is slidably engaged in a cylinder 6a of the output shaft 6 to form a servo device. A chamber 10 of the servo device is also communicated with hydraulic control circuit 20. A drive belt 11 engages with the drive pulley 7 and the driven pulley 8.

Secured to the output shaft 6 is a drive gear 12 which engages with an intermediate reduction gear 13 on an intermediate shaft 14. An intermediate gear 15 on the shaft 14 engages with a final reduction gear 16. The rotation of the final reduction gear 16 is transmitted to axles 18 of a vehicle driving wheels 19 through a differential 17.

Figure 2A:
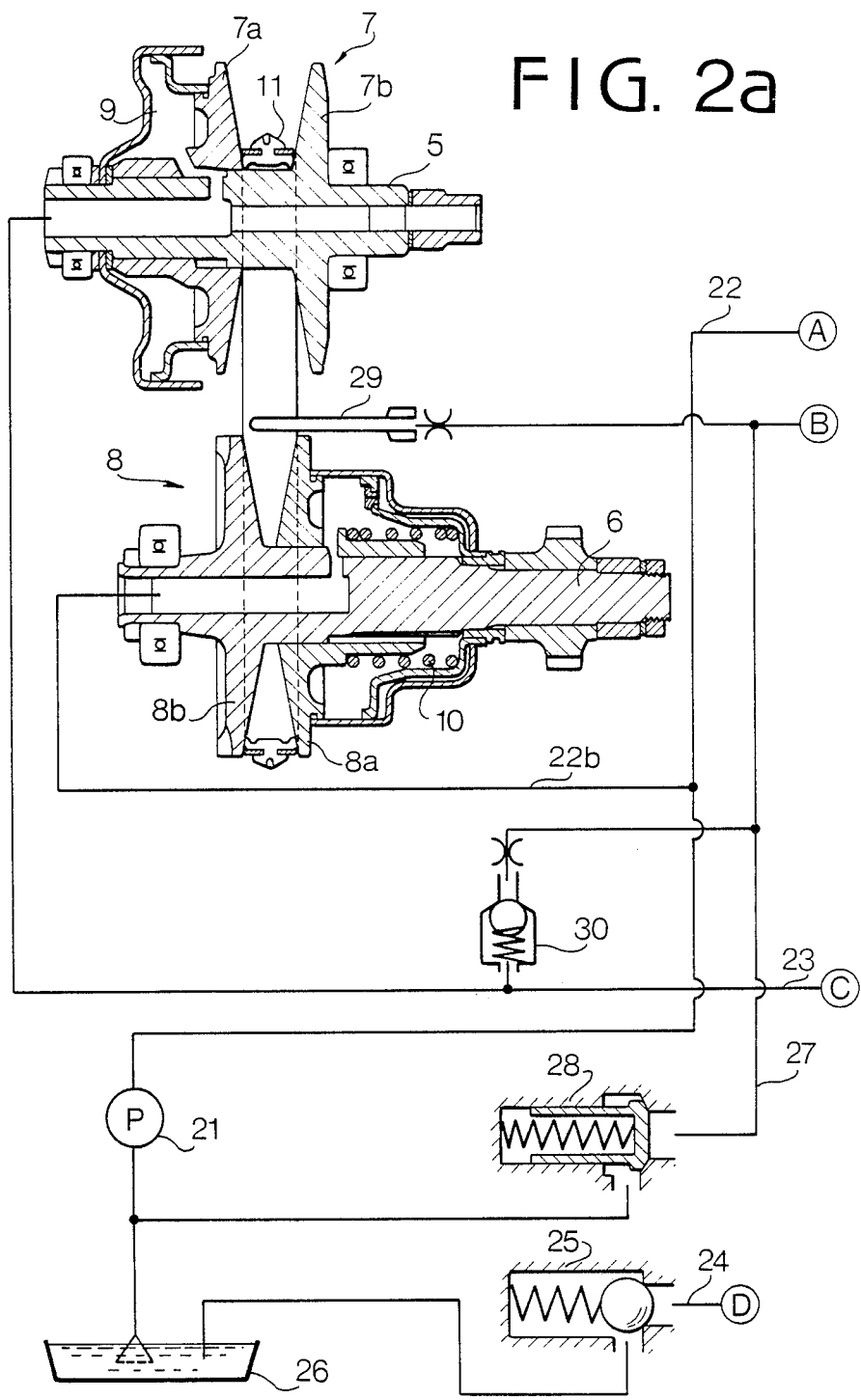
FIGS. 2a to 2c are schematic diagrams showing a control system according to the present invention.
Figure 2B:
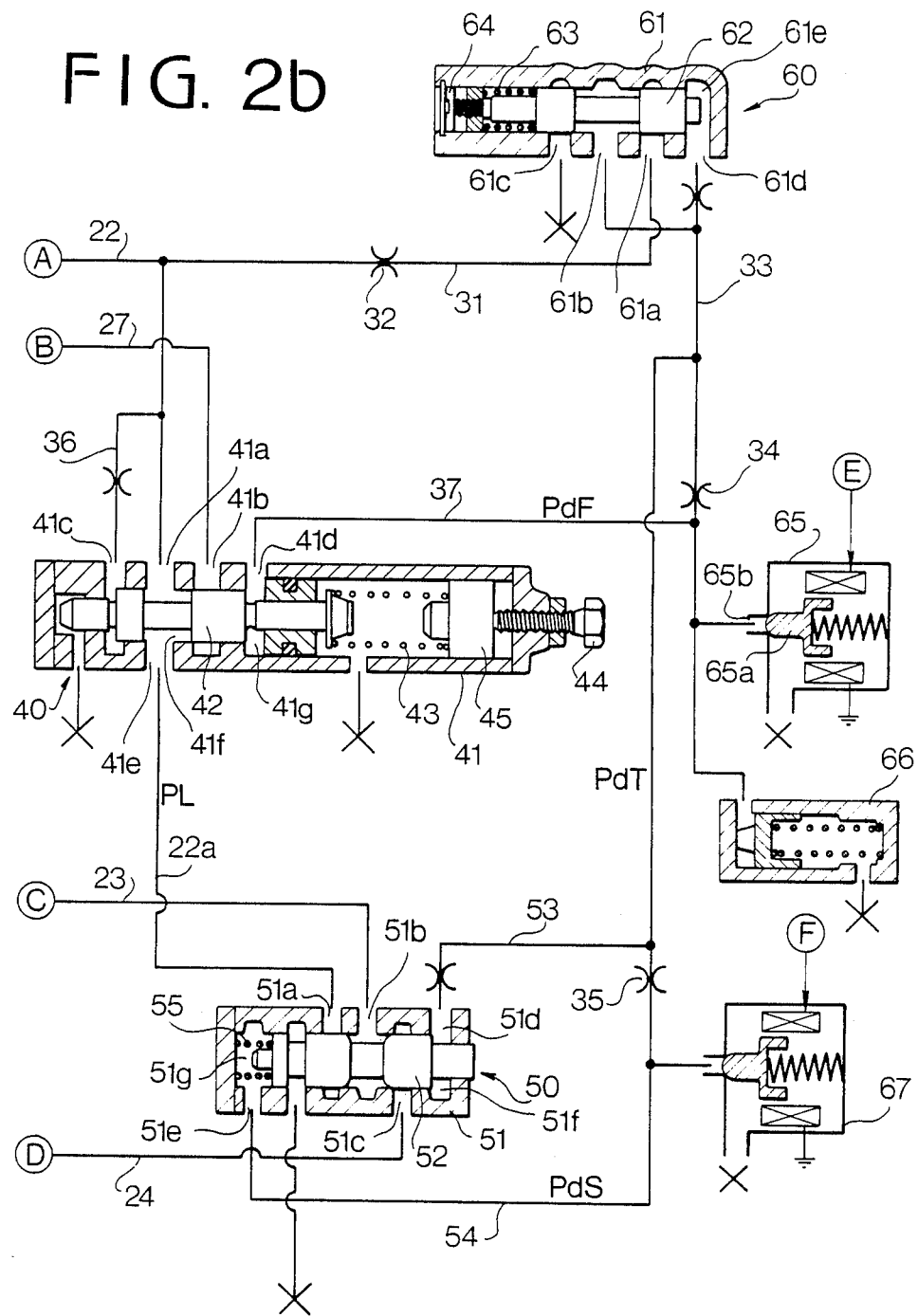
Figure 2C:
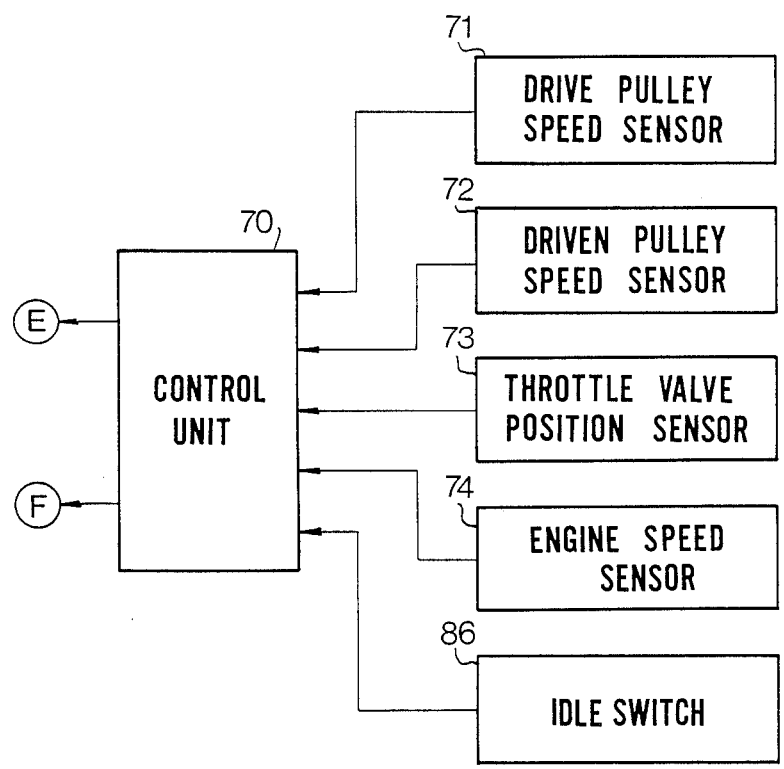

Referring to FIGS. 2a to 2c, the hydraulic control circuit 20 includes a line pressure control valve 40 and a transmission ratio control valve 50. The line pressure control valve 40 comprises a valve body 41, spool 42, and ports 41a, 41b, 41c, 41d, 41e and chambers 41f and 41g. The chamber 9 of the drive pulley 7 is applied with pressurized oil by an oil pump 21 from an oil reservoir 26 passing through a line pressure conduit 22, ports 41a and 41e of line pressure control valve 40, transmission ratio control valve 50, and conduit 23. The chamber 10 of driven pulley 8 is applied with pressurized oil through a passage 22b without passing through valves 40 and 50. The movable conical disc 7a of the drive pulley 7 is so designed that the pressure receiving area thereof is larger than that of movable conical disc 8a of the driven pulley 8. The spool 42 is applied with pressurized oil supplied to a chamber communicating with port 41c through a conduit 36. The spool 42 is urged toward the left by the force of a spring 43 provided between the end of the spool and a retainer 45, the position of which is adjustable by a screw 44. The port 41a is communicated with port 41b of a drain passage 27 in accordance with the position of a land of the spool 42.

The transmission ratio control valve 50 comprises a valve body 51, spool 52, and spring 55 for urging the spool in the downshift direction. A port 51b of the valve body 51 is selectively communicated with a pressure oil supply port 51a or a drain port 51c in accordance with the position of lands of spool 52. Port 51b communicates with chamber 9 through conduit 23, and port 51a communicates with line pressure control valve 40 through conduit 22a. The drain port 51c is communicated with the oil reservoir 26 through a conduit 24 and check valve 25. The drain port 41b of the line pressure control valve 40 communicates with oil reservoir 26 through passage 27 and a lubricating oil pressure providing valve 28 in the form of a check valve. The passage 27 is further communicated with conduit 23 through a check valve 30. A part of the oil in the passage 27 is supplied to the pulley 8 from a nozzle 29 to lubricate the pulley device.

The system of the present invention is provided with a pressure reducing valve 60, and solenoid operated on-off control valves 65 and 67. The pressure reducing valve 60 comprises a valve body 61, spool 62, inlet port 61a, basic pressure port 61b, drain port 61c, and end chamber port 61d, spring 63 urging the spool 62 toward a chamber 61e. The basic pressure port 61b is positioned between the inlet port 61a and drain port 61c, and the spring 63 is positioned opposite the end chamber 61e against the regulator pressure. The load of the spring 63 can be adjusted by an adjust screw 64. The port 61a is connected to the pump 21 through a conduit 31 having an orifice 32 and conduit 22, and ports 61b and 61d are connected to a conduit 33. When the pressure in the conduit 33 reduces, the spool 62 is shifted to the right by spring 63, so that port 61a communicates with port 61b to increase the pressure in the conduit 33. Thus, a constant basic pressure of oil which is lower than the line pressure is provided in the conduit 33.

The conduit 33 is communicated with the port 41d of line pressure control valve 40 through an orifice 34 and a passage 37. The conduit 33 is also communicated with reservoir 26 through solenoid operated on-off valve 65 and with an accumulator 66. Further, the conduit 33 is communicated with an end chamber 51f of the port 51d of the transmission ratio control valve 50 through a passage 53 and with another end chamber 51g of a port 51e through a passage 54 having an orifice 35. The solenoid operated on-off valve 67 is connected to the passage 54 downstream of orifice 35 so as to drain the oil in the chamber 51g of the drive pulley transmission ratio control valve 50 to the reservoir 26. The solenoid operated valve 65 is adapted to be operated by pulses. When energized, a valve 65a opens a drain port 65b. The solenoid operated valve 67 is the same as valve 65 in construction and operation. The control valves 65 and 67 are operated by pulses from a control unit 70. Thus, control pressures of control oil applied to ports 41d, 51e are changed by changing the duty ratios of the pulses supplied to the control valves 65 and 67.

In the line pressure control valve 40, the relationship among spring load $F_S$ and line pressure PL, line pressure receiving area SL of the spool 42, first control pressure $P_dF$ at the port 41d, and control pressure receiving area $S_d$ is as follows:

$$F_S + P_dF \cdot S_d = PL \cdot SL$$

$$PL = (P_dF \cdot S_d + F_S)/SL$$

Accordingly, the line pressure PL is proportional to the control pressure $P_dF$.

In the transmission ratio control valve 50, the pressure receiving area of the spool 52 at chamber 51g is set to a value larger than the area at the chamber 51f. On the other hand, second control pressure $P_dS$ in the chamber 51g can be changed between a maximum value, which is the same as third control pressure $P_dT$ in the chamber 51f when the duty ratio of pulses supplied to control valve 67 is 0%, and a minimum value by controlling the duty ratio of the pulses for operating the control valve 67. The transmission ratio control valve 50 is so arranged that the spool 52 is at a neutral position at a middle duty ratio (for example 50%) and is located in an oil supply position by increasing the duty ratio from the middle duty ratio because of reduction of control pressure in the chamber 51g. Further, the speed of the movement of the spool increases with decreasing duty ratio. The spool 52 is shifted to an oil drain position by decreasing the duty ratio. It will be understood that when the oil is supplied to the chamber 9, the transmission is upshifted.

The relationship between the duty ratio (D) of the pulses applied to the solenoid operated control valve 67 and the transmission ratio (i) is explained hereinafter.

The transmission ratio changing speed (di/dt) is a function of flow rate Q of oil supplied to the chamber 9, and the flow rate Q is a function of duty ratio D, line pressure PL and primary pressure $P_p$ in the chamber 9, namely:

$$di/dt = F(Q) = F(D, PL, P_p)$$

The line pressure PL is determined by the transmission ratio i and engine torque, and the primary pressure $P_p$ in the chamber 9 is determined by the transmission ratio i and the line pressure PL. Accordingly, assuming the engine torque to be constant, $$di/dt = f(D, i)$$

$$D = f(di/dt, i)$$

Accordingly, the duty ratio is determined by the transmission ratio changing speed di/dt and the transmission ratio i. On the other hand, the transmission ratio changing speed di/dt is dependent on the difference between the actual transmission ratio i and a desired transmission ratio id, $$di/dt = k(id - i)$$

where k is a coefficient

Accordingly, if the transmission ratio changing speed di/dt is determined, the duty ratio D can be obtained from the speed. When the actual transmission ratio i is larger than the desired transmission ratio id (i>id), the value of di/dt is negative. In such a state, the duty ratio D is increased to reduce the pressure in the chamber 51g so as to upshift the transmission. The downshifting is performed in the reverse manner.

Figure 3A:
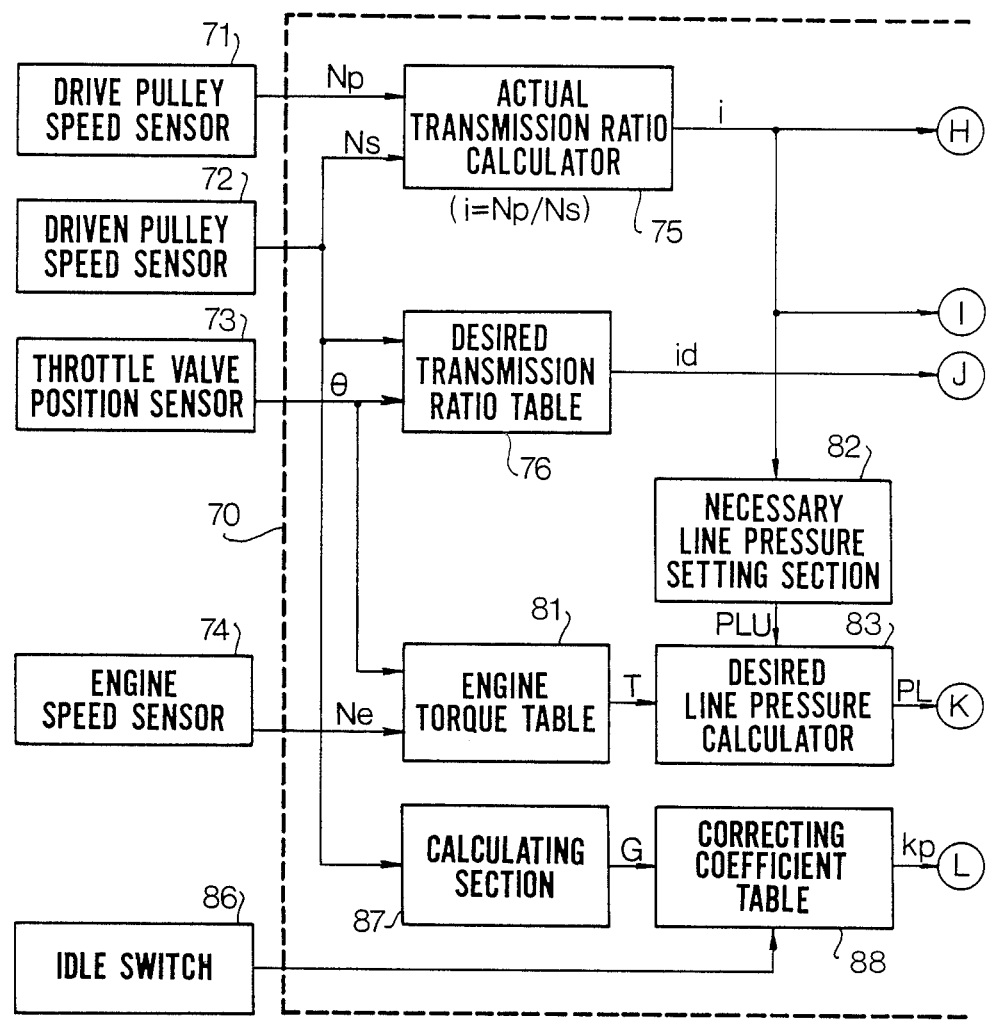
FIGS. 3a and 3b are block diagrams of a control unit used in the system.
Figure 3B:
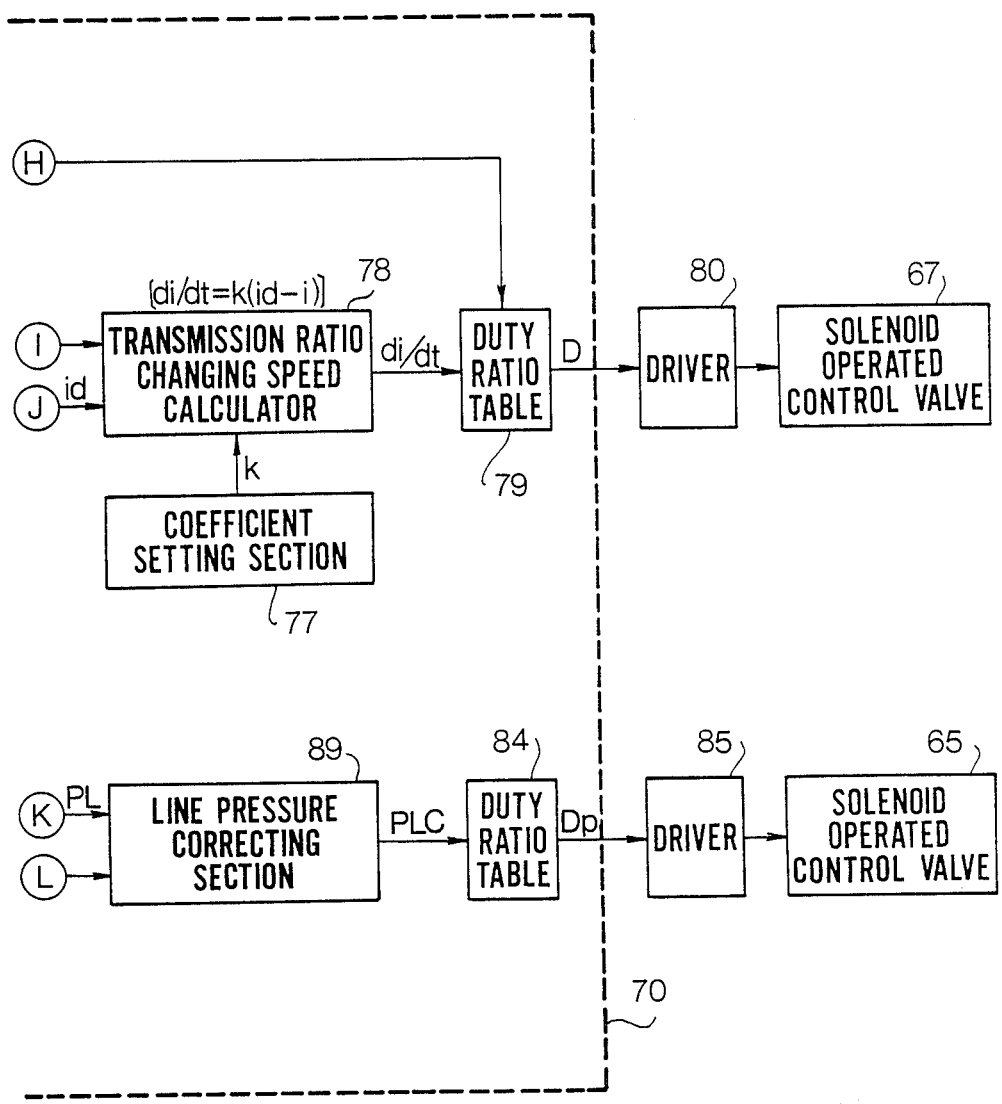

Referring to FIGS. 3a and 3b, the system is provided with a drive pulley speed sensor 71, driven pulley speed sensor 72, throttle valve position sensor 73, engine speed sensor 74 and idle switch 86. Output signals $N_p$ and $N_s$ of sensors 71 and 72 are fed to an actual transmission ratio calculator 75 in the control unit 70 to produce an actual transmission ratio i in accordance with $i = N_p/N_s$. The output signals $N_s$ of the sensor 72 and the output signal $\theta$ of the throttle valve position sensor 73 are fed to a desired transmission ratio table 76. The desired transmission ratio id is fetched from the table in accordance with the signals $N_s$ and $\theta$. The actual ratio i, desired ratio id and coefficient k from a coefficient setting section 77 are applied to a transmission ratio changing speed calculator 78 to produce a transmission ratio changing speed di/dt from the formula $di/dt = -k(id - i)$.

The speed di/dt and actual ratio i are applied to a duty ratio table 79 to derive the duty ratio D of pulses for control valve 67. The duty ratio in the table 79 decreases with increases of the speed di/dt and ratio i. The duty ratio D is supplied to the solenoid operated valve 67 through a driver 80.

On the other hand, an output signal Ne of the engine speed sensor 74 and throttle position signal $\theta$ are fed to an engine torque table 81 to derive engine torque T. On the other hand, actual ratio i is applied to a necessary line pressure setting section 82 which produces a necessary line pressure $PL_u$ from a graph. The necessary line pressure $PL_u$ and engine torque T are fed to a desired line pressure calculator 83 to produce desired line pressure PL dependent on $PL = PL_u \times T$. The desired line pressure PL is applied to a duty ratio table 84 through a line pressure correcting section 89 to produce a duty ratio DP dependent on the desired line pressure. The duty ratio DP is applied to the solenoid operated valve 65 through a driver 85.

In accordance with the present invention, an idle switch 86 detecting the idle operation of the engine is provided in order to detect coasting of the vehicle, and a calculating section 87 is provided for calculating the magnitude of deceleration based on the output signal $N_s$ of driven pulley speed sensor 72. The magnitude G is calculated as follows.

$$G = N_s \times n - N_s \times n - 1$$

where $N_s \times n$ is the output signal of the driven pulley speed sensor 72 at a time in the operation cycle, and $N_s \times n - 1$ is the output signal of the sensor at the last time of the operation cycle.

Figure 4:
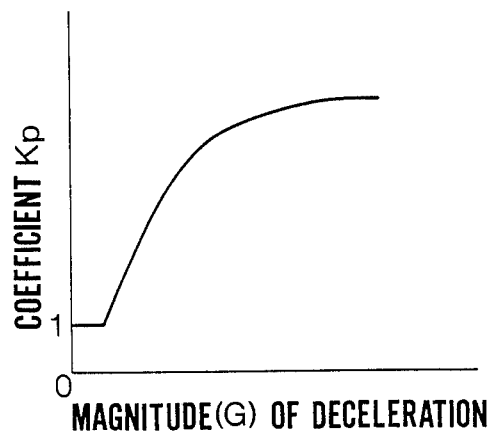
FIG. 4 is a graph showing the relationship between the magnitude of deceleration of a vehicle and correcting coefficient.

The output signal G of the calculator 87 and the output signal of the idle switch 86 are fed to a correcting coefficient table 88 to derive a correcting coefficient $K_p$. The coefficient increases with increase of the magnitude (G) of deceleration as shown in FIG. 4. The derived correcting coefficient $K_p$ is applied to the line pressure correcting section 89. The desired line pressure $P_L$ is multiplied by the correcting coefficient $K_p$ to produce a corrected desired line pressure $P_{LC}$ ($P_{LC} = P_L \times K_p$) at the line pressure correcting section 89. The corrected desired line pressure $P_{LC}$ is applied to the duty ratio table 84 to derive the duty ratio $D_P$ corresponding to the line pressure $P_{LC}$ which is applied to the solenoid operated valve 65 through driver 85.

In operation, while the vehicle is at a stop, chamber 10 of the driven pulley is supplied with line pressure through passage 22b, and the chamber 9 of the drive pulley is drained, since the signals $N_p$, $N_s$, $\theta$ are zero and duty ratio is zero, so that the spool 52 is at the right end position and the drain port 51c communicates with the chamber 9 through the conduit 23. Thus, in the pulley and belt device of the continuously variable belt-drive transmission, the driving belt 11 engages with the driven pulley 8 at a maximum running diameter to provide the maximum transmission ratio (low speed stage). When the accelerator pedal is depressed, the electromagnetic clutch 2 is gradually engaged, transmitting the engine power to the drive pulley 7. The power of the engine is transmitted to the output shaft 6 at the maximum transmission ratio by the driving belt 11 and driven pulley 8, and further transmitted to the axles of the driving wheels 19. Thus, the vehicle is started.

At that time the line pressure PL is at the highest value by the line pressure control valve 40, since the duty ratio DP for the valve 65 is small, and the spool 42 of the control valve 40 is at the left end position. When the throttle valve is opened for acceleration, the desired transmission ratio id and transmission ratio changing speed di/dt are calculated by calculators 76, 78, and duty ratio D is obtained from the table 79. The value of the duty ratio D is larger than the neutral value, so that the pressure in the chamber 51f of the control valve 50 is higher than the chamber 51g. Thus, the spool 52 is shifted to the left to communicate the port 51a with port 51b, so that oil is supplied to the chamber 9 through the conduit 23. On the other hand, duty ratio DP for the control valve 65 is increased, so that the pressure in the chamber 41g becomes low to shift the spool 42 of the valve 40 to the right. Accordingly, the port 41a communicates with the port 41b of the drain passage 27. Thus, the line pressure reduces, and the transmission is upshifted, since oil is still supplied to the chamber 9 through the control valve 50. As the difference between the desired ratio id and actual ratio i becomes large, the duty ratio D for the control valve 67 becomes large, thereby increasing the transmission changing speed di/dt. When the opening degree of the throttle valve is reduced for deceleration, the duty ratio D is reduced, thereby shifting the spool 52 to the right to drain the chamber 9. Thus, the transmission is downshifted. The transmission changing speed at downshifting increases with reducing of the duty ratio.

Figure 5:
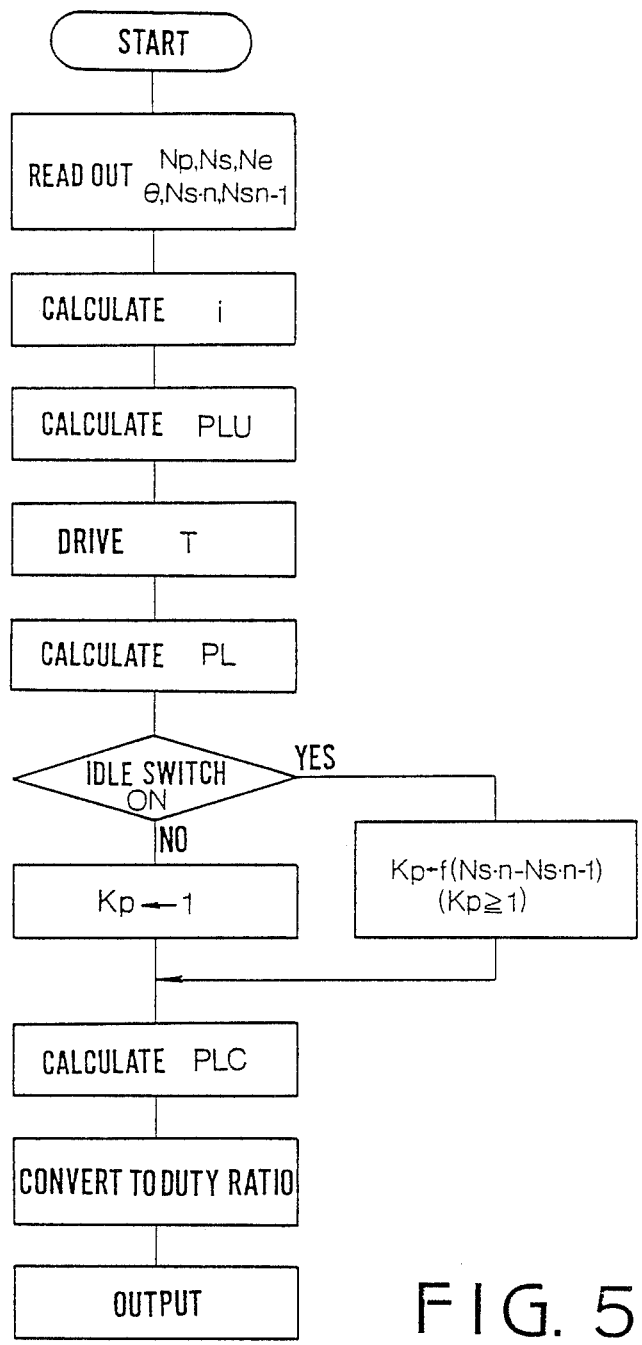
FIG. 5 is a flowchart showing a line pressure control operation.

Referring to FIG. 5, when the accelerator pedal is depressed, the correcting coefficient $K_P$ is set to "1" ($K_P = 1$), which means $P_{LC} = P_{LV}$. When the accelerator pedal is released, the idle switch 86 is turned on. If the vehicle is decelerated, the magnitude of the deceleration (G) is calculated at the calculator 87 and desired correcting coefficient $K_P$ is derived from the table 88 ($K_P > 1$). Thereafter, a corrected desired line pressure $P_{LC}$ is calculated ($P_{LC} = P_L \times K_P$) at section 89, thereby decreasing the duty ratio $D_p$. Thus, the amount of drain from the solenoid operated control valve 65 decreases, so that the spool 42 of line pressure control valve 40 is shifted to the left. Accordingly, line pressure increases, thereby preventing the belt 11 from slipping on the pulleys 7 and 8. The corrected line pressure increases with an increase of the magnitude of deceleration (G) to increase the belt gripping force of pulleys. Thus, the slipping of the belt can be effectively prevented.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A control system for a continuously variable transmission for transmitting the power of an internal combustion engine to driving wheels of a motor vehicle through a clutch, having a drive pulley having a hydraulically shiftable disc and a first hydraulic cylinder for shifting the disc, a driven pulley having a hydraulically shiftable disc and a second hydraulic cylinder for operating the disc, a belt engaged with both pulleys, a line pressure control valve having ports and a spool, a transmission ratio control valve having ports and a spool, a first hydraulic circuit having a pump for supplying oil to the first cylinder through the line pressure control valve and transmission ratio control valve, the system comprising:

a second hydraulic circuit for supplying control oil to the line pressure control valve so as to shift the spool thereof;

control valve means provided in the second hydraulic circuit for controlling amount of the control oil supplied to the line pressure control valve;

first means for detecting a coasting state of said motor vehicle and for producing a coasting signal;

second means for detecting the magnitude of deceleration of said motor vehicle and for producing a deceleration signal dependent on the magnitude;

third means responsive to the coasting signal and to the deceleration signal for operating the control valve means, so that the spool of the line pressure control valve is shifted to increase the line pressure in dependence on said magnitude of the deceleration.

2. The control system according to claim 1 wherein the control valve means is a solenoid operated on-off valve.

3. The control system according to claim 1 wherein said first means is an idle switch producing said coasting signal when an accelerator pedal of the vehicle is released.

4. The control system according to claim 3 wherein said second means comprises a calculator means for calculating the magnitude of the deceleration of the vehicle based on decrease of driven pulley speed.

5. In a control system for a continuously variable transmission for transmitting power of an internal combustion engine to driving wheels of a motor vehicle through a clutch, the transmission having a drive pulley having a hydraulically shiftable disc and a first hydraulic cylinder for shifting the disc, a driven pulley having a hydraulically shiftable disc and a second hydraulic cylinder for operating the disc of the driven pulley, a belt engaged with both pulleys, the control system comprising a line pressure control valve having ports and a spool, a transmission ratio control valve having ports and a spool, a first hydraulic circuit having a pump for supplying oil to the first hydraulic cylinder through the line pressure control valve and transmission ratio control valve to control the transmission ratio of the transmission, the improvement in the control system comprising:

a second hydraulic circuit for supplying control oil to the line pressure control valve so as to shift the spool of the line pressure control valve to control line pressure in the first hydraulic circuit;

control valve means provided in the second hydraulic circuit for controlling the control oil supplied to the line pressure control valve;

first means for detecting a coasting state of said motor vehicle and for producing a coasting signal;

second means for detecting the magnitude of deceleration of said motor vehicle and for producing a deceleration signal dependent on the magnitude;

third means responsive to the coasting signal and to the deceleration signal for operating the control valve means so that the spool of the line pressure control valve is shifted to increase the line pressure in dependence on said magnitude of the deceleration.

6. The control system according to claim 5 wherein the second hydraulic circuit is provided with another pressure control valve for maintaining the pressure of the control oil at a constant value.

7. The control system according to claim 6, wherein said control valve means controls said constant pressure control oil in response to said third means.

8. The control system according to claim 7, further comprising
   an orifice in said second hydraulic circuit between said control valve means and said another pressure control valve.

9. The control system according to claim 6, wherein said another pressure control valve communicates with said pump providing said control oil.

10. The control system according to claim 5, further comprising
    an accumulator in said second hydraulic circuit communicating with said control valve means.

11. The control system according to claim 5, wherein said third means includes means for controlling said spool of the line pressure control valve so that said line pressure has a desired line pressure in the absence of said coasting signal.

12. The control system according to claim 11, wherein
    said third means includes means for controlling said spool of the increased line pressure control valve so that said increased line pressure equals a coefficient times said desired line pressure during the occurrence of said coasting signal, and
    said third means further includes means for selecting said coefficient as a function of said magnitude of deceleration.

13. The control system according to claim 12, wherein
    said means for selecting said coefficient as function of said magnitude of deceleration selects said coefficient as 1 during low magnitude of deceleration, said coefficient increasing substantially linearly in intermediate values of said magnitude of deceleration and substantially asymptotically increasing to a maximum value at higher values of said magnitude of deceleration.

* * * * *